Oct. 28, 1941.  F. W. BURGER  2,260,828
WHEEL
Filed April 17, 1939  4 Sheets-Sheet 3

INVENTOR.
FREDERICK W. BURGER.
BY Walter E. Schirmer
ATTORNEY.

Oct. 28, 1941.  F. W. BURGER  2,260,828
WHEEL
Filed April 17, 1939  4 Sheets-Sheet 4

INVENTOR
FREDERICK W. BURGER.
BY *Walter E. Schirmer*
ATTORNEY.

Patented Oct. 28, 1941

2,260,828

UNITED STATES PATENT OFFICE 2,260,828

WHEEL

Frederick W. Burger, Niles, Mich., assignor to Clark Equipment Company, Buchanan, Mich., a corporation of Michigan Application April 17, 1939, Serial No. 268,174

16 Claims. (Cl. 188—18)

This invention relates to wheels, and more particularly is directed to a dual wheel assembly of the compensating type.

Broadly considered, the present invention contemplates a dual wheel assembly for trucks and trailers in which the wheels are so arranged as to have relative rotation to eliminate tire scuffing, when turning the truck or trailer, caused by the difference in turning radii.

In the present construction, the tire rims are carried on separate wheel bodies rotatably mounted on the axle arm, and the wheel bodies are capable of relative rotation with respect to each other when the vehicle is turned in either direction.

One of the primary objects of the present invention is to provide a dual wheel construction of this type having means operable upon energization of the brakes for locking the two wheels together so that both tires will have the braking reaction applied thereto when the brake system is actuated.

Another object of the present invention is to provide means automatically controlled upon actuation of the brakes for interlocking the two wheel bodies to prevent any relative rotation, the interlocking means being automatically released automatically released when the braking effort when the braking effort is removed.

Still another object of the present invention is to provide two wheel bodies or spiders for supporting the two tire rims with the assembly so arranged that both tire rims can be removed from the outboard side of the wheel assembly without requiring removal of the outboard wheel spider.

Still another feature of the present invention is the provision of a construction in which the space between the two wheel spiders is open to provide adequate ventilation between the tires and to prevent the accumulation of mud, snow, ice or the like therebetween.

Another feature of the present invention is the provision of a brake drum on the inboard side of the inboard wheel with means carried by the brake assembly and operable axially through the inboard wheel spider for locking the two wheel spiders together to prevent relative rotation therebetween during brake actuation.

Other objects and advantages of the present invention will appear more fully from the following detailed description which, taken in conjunction with the accompanying drawings, will disclose to those skilled in the art the particular construction and operation of a preferred form of the present invention.

Figure 1:
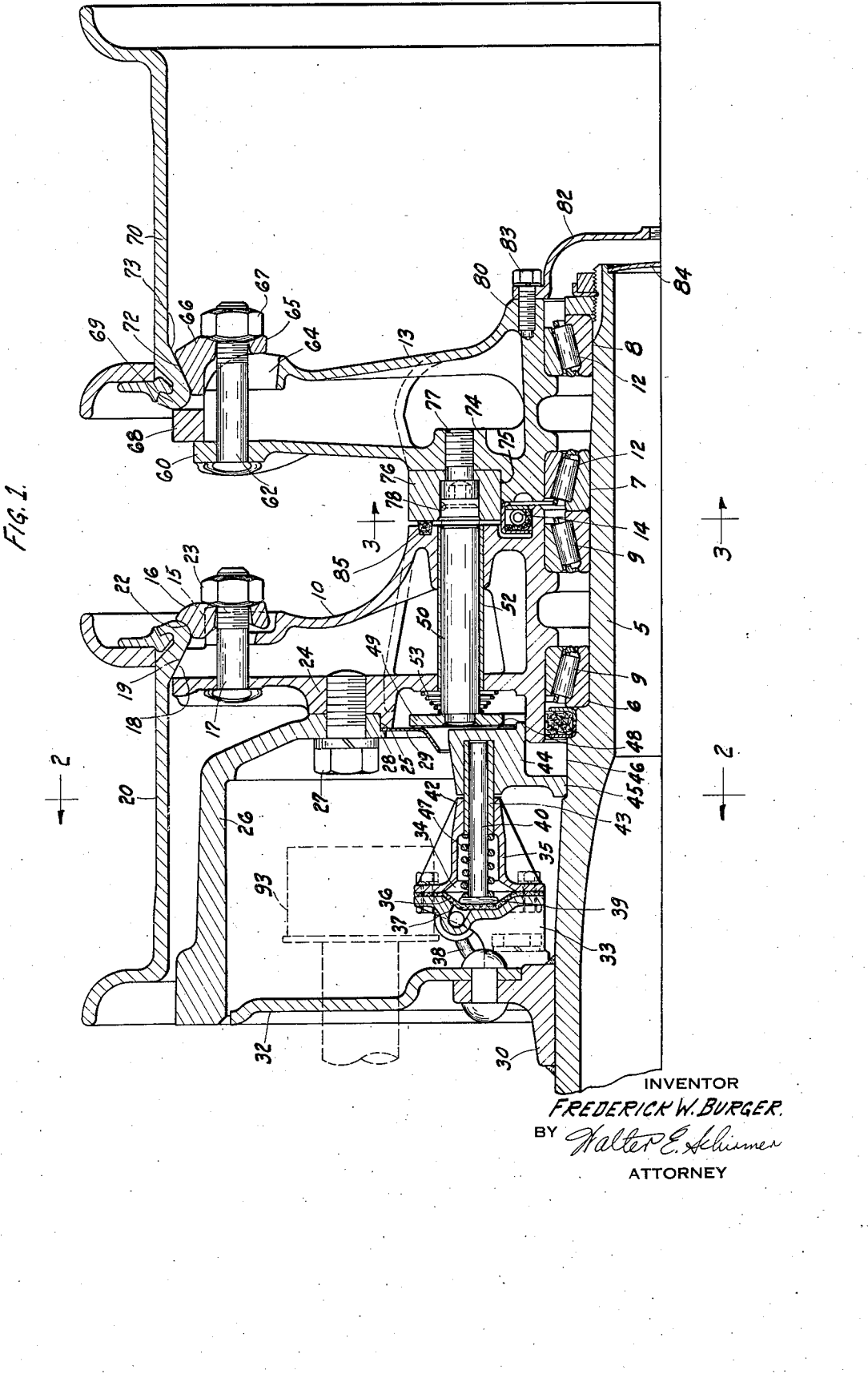
Figure 1 is a sectional view through a wheel assembly embodying the present invention.
Figure 2:
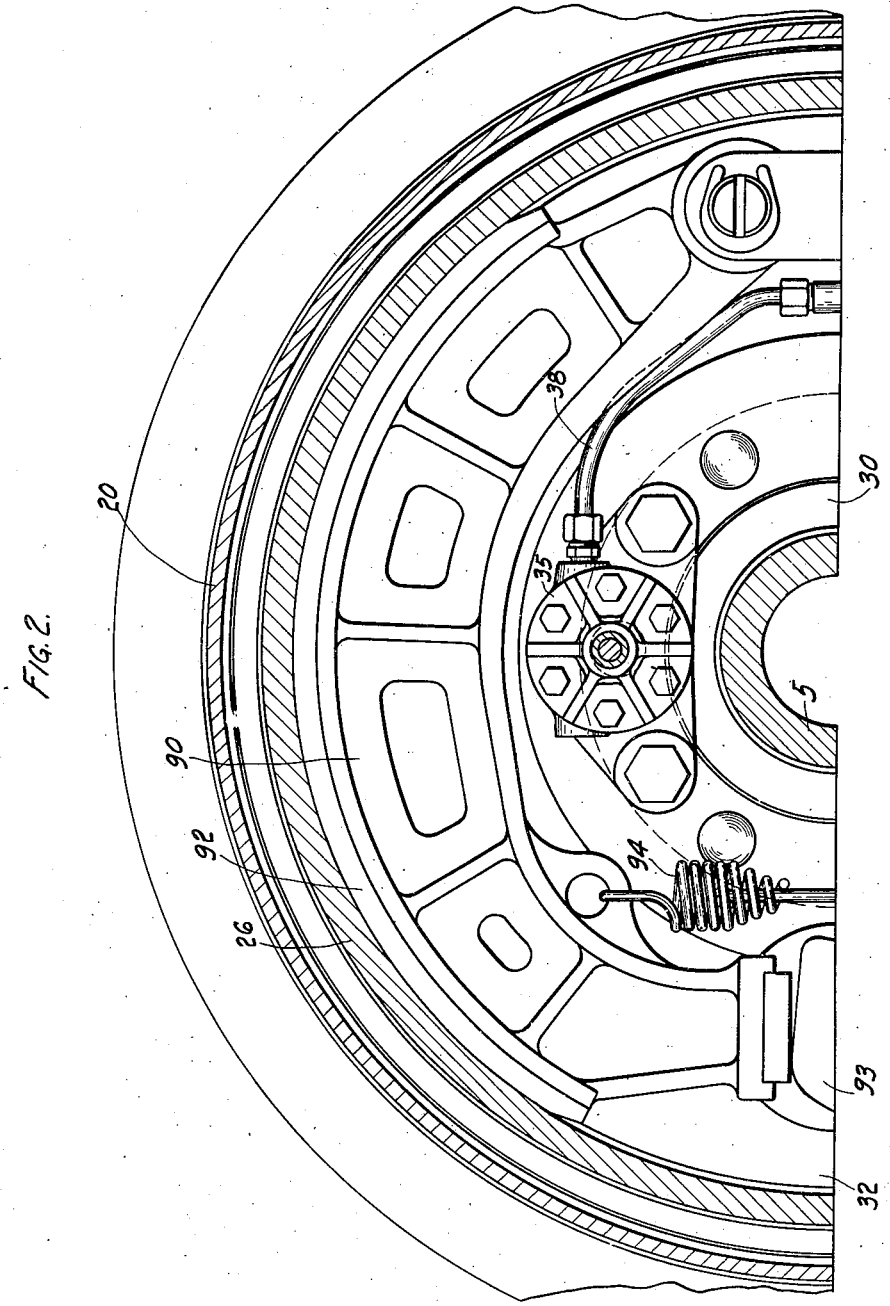
Figure 2 is a section taken on line 2—2 of Figure 1.
Figure 3:
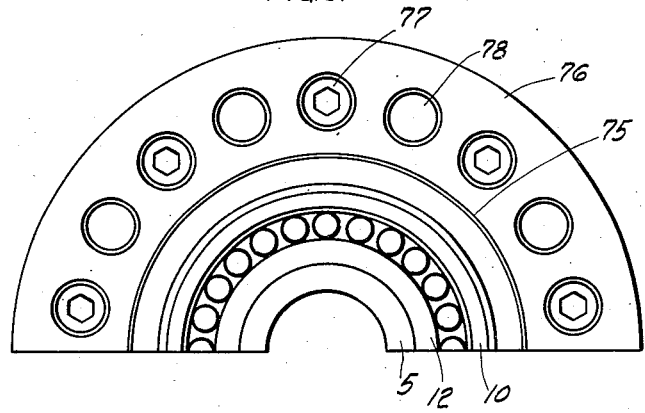
Figure 3 is a section taken on line 3—3 of Figure 1.

Referring now in detail to Figures 1 to 3 of the drawings, an axle housing arm is indicated generally at 5, and may comprise a tubular dead axle member which is swaged down adjacent its ends to provide the bearing seat portions 6, 7 and 8.

Mounted on the bearings 9 at the inner end of the bearing seat sections is the inboard wheel spider indicated generally at 10, while the outboard wheel spider is mounted on the bearings 12 and is indicated generally by the reference numeral 13. Suitable lubricant sealing means 14 is located between the two wheel spiders at their adjacent faces to prevent leakage of lubricant outwardly from the bearings 9 and 12.

The wheel spider 10 is preferably of the cast spoke type having hollow radially extending spokes provided at their outer ends with axially directed spaced seating surfaces 15 which are adapted to receive a rim clamping lug 16 carried by the clamping bolts 17 extending transversely through the outer ends of the spokes. A suitable rim seating surface 18 is provided extending radially outwardly and axially inwardly of the seats 15, being inclined at an angle corresponding to the angle of the gutter edge portion 19 of a tire rim 20. The tire rim 20 is mounted in position to overhang axially inwardly of the wheel spider 10, and the lateral edge of the gutter portion 19 thereof is engaged by the arcuately curved portion 22 of the lug 16 whereby, upon tightening of the nut 23 on the bolt 17, the lug 16 is forced axially along the shoulders 15 to wedge the gutter of the rim firmly upon the seats 18 to chord the rim radially into fixed position on the wheel spider.

The rear walls of the spokes of the wheel spider 10 are provided with boss portions 24 which have shouldered portions 25 forming pilots for the brake drum 26, which may be of any conventional construction and which is secured on the pilots 25 and against the bosses 24 by means of the studs 27. The head flange of the brake drum is provided with a lip portion 28 between which and the pilot surface 25 is clamped the brake closure plate 29 in a manner similar to that disclosed in my United States Patent No. 2,094,637, issued October 5, 1937.

Mounted on the axle arm 5 inwardly of the support for the wheel spider 10 is the usual brake flange 30 which may be welded or otherwise rigidly secured in position, and which carries the backing plate 32 closing the brake drum. Mounted at diametrically opposite points on the backing plate are suitable brackets 33 which form with corresponding brackets 35, pressure chambers 34. Clamped between the brackets 33 and 35 is a diaphragm 36 which is subjected to pressure on one face thereof through the port 37 connected through the common conduit 38 to any suitable source of pressure supply such as the pressure system used for actuating the brakes carried within the brake drum 26.

The diaphragm bears against the enlarged head 39 of a plunger 40 piloted in an extending portion 42 of the bracket 35 within the sleeve or bushing 43, which extends into the annular ring 44 in which the outer ends of the two plungers 40 are located. The ring 44 fits within the opening formed by the closure plate 29, and has an inwardly extending portion 45 forming a pilot for guiding the same along the cylindrical surface 46 of the axle arm. A suitable coil spring 47 is biased between the extension 42 of the bracket 35 and the head end 39 of the plunger 40, and normally urges the plunger toward retracted position to hold the ring 44 in disengaged position.

The ring 44 has a radial abutment face 48 which is adapted to bear against a corresponding ring 49 carried by a circumferential series of plungers or poppets 50, mounted for reciprocatory movement in the sleeves 52 carried by the hub portion of the wheel spider 10. The poppets 50 extend axially through the wheel spider, and are normally held in retracted position by the springs 53 biased between the rear wall of the wheel spider 10 and the ring 49 carried within the closure plate 29 and radially inwardly of the boss 24. The bushings or sleeves 52 form guides for the plungers 50 to facilitate their reciprocatory movement axially of the wheel spider.

Considering now the wheel spider 13 which is mounted on the bearings 12, this spider is simple in construction having radially extending spokes terminating at their outer ends in a radially extending wall portion 60 through which extends the transverse clamping bolts 62. Axially directed shoulders 63 are formed at each spoke end and define with the recess of 64 U-shaped outwardly directed sockets within which the heel portions 65 of the clamping lugs 66 are adapted to be received. Each of the clamping lugs 66 has laterally extending shoulders or wings riding on the shoulders 63 for guiding the lug 66 axially inwardly upon tightening of the nut 67. Between the shoulder 63 and the wall 60, there is formed a radially extending abutment which provides a stop for an annular ring 68, which is preferably of square or rectangular section and which projects radially outwardly a sufficient distance to be engaged by the lateral edge of the gutter portion 69 of the rim 70. The lug 66 has a tapered surface 72 which cooperates with the bevel edge 73 of the rim for wedging the same radially outwardly when the rim has been moved against the stop ring 68 in order to chord the rim in fixed position on the wheel spider 13.

The inboard wall of the wheel spider 13 is provided with boss portions 74 which have axially inwardly formed shoulders 75 at the radial inner ends thereof providing an annular pilot for receiving the hardened steel ring 76 which is secured thereto by means of the studs 77. The ring 76 is provided with a circumferential series of axially directed openings 78 of a diameter corresponding to the diameter of the plungers 50.

Preferably, six plungers 50 are provided, arranged in a circumferential series, while the ring 76 is provided with a circumferential series of openings of a number constituting a multiple of the number of plungers, in the present embodiment being 18 so that there is one plunger for every three openings.

The outboard wheel spider 13 has a hub portion 80 to which is clamped the hub cap 82 by means of the studs 83 for closing the end of the wheel assembly, and the end of the axle arm 5 is similarly closed by means of a snap disc 84. Suitable sealing means 85 is carried in an axial recess in the outboard face of the hub portion of the wheel spider 10, and has engagement with the radial face of the ring 76 outwardly of the openings 78 in order to seal the space between the two wheel spiders against entrance of foreign material.

In the operation of the mechanism thus far described, the plungers 50 are normally held in retracted position by the springs 53 whereby the outer ends of the plungers are disposed within the outer portion of the wheel spider 10. However, when the brakes carried within the brake drum 26 are actuated, pressure is supplied through the conduit 38 and the ports 37 to the diaphragms 36 which move the diaphragms in the chambers 34 resulting in axial movement of the plungers 40 against the pressure of spring 47, these plungers being connected to the ring 44. This ring is moved axially outwardly engaging the ring 49 to force the plungers or poppets 50 axially through the wheel spider 10. The chamferred outer ends of the plungers 50 are thereby forced into such of the openings 78 as are in alinement therewith, and thus lock the two wheel spiders 10 and 13 together for conjoint rotation. Thus braking effort applied to the drum 26 is imparted directly to the wheel spider 10 and through the poppet arrangement, is also transmitted to the wheel spider 13 so that the braking action is applied to the tires carried by each of the rims 20 and 70. Upon release of the brakes, the springs 53 and 47 function to move the plungers 50 out of engagement within the openings in the ring 76 and to move the ring 44 axially inwardly out of abutment with the ring 49. This release of the plungers releases the interlocking connection between the wheel spiders 10 and 13, thus placing the wheel spiders in position for independent relative rotation when the vehicle is turned, thereby preventing tire scuffing. As clearly shown in Figure 3, only certain of the openings 78 are provided with the studs 77 which secure the ring 76 to the boss 74. However, since all of the plungers 50 are riveted to the ring 49, they will all move an equal distance, which is short of the axial distance that the head of the stud 77 is countersunk within the openings 78, thus eliminating any possibility of interference at this point.

It is to be understood that any desired number of plungers may be carried in the wheel spider 10, and that the ring 76 carried by the wheel spider 13 may have any number of alined openings formed therein. However, it will be apparent that with the particular embodiment disclosed; that is, the use of six plungers with a ring having 18 openings, the plungers will all engage in the openings within a maximum relative rotation between the two wheels of 20 degrees. Obviously, as a rule, the relative rotation between the two wheels will be approximately 10 degrees on an average before the plungers engage. This amount of rotation would be insufficient to produce any undesired effects prior to locking of the wheels together to apply conjoint braking reaction thereto. By increasing the number of holes or points that locking can take place, it is apparent that the amount of displacement between the two wheels can be correspondingly reduced.

Considering Figure 2, the brake shoes 90 are shown in position in this figure, and carry the customary brake lining 92 adapted to engage the inner surface of the brake drum 26 carried by the wheel spider 10. The brake shoes are adapted for actuation upon rotation of the wedge cam 93 controlled from any suitable actuating means, such as a pressure cylinder or the like. A suitable spring 94 is normally provided to urge the shoes to released position upon de-energization of the brake actuating means. The same pressure supply source which actuates the cam 93 can also be connected through the conduit 38 to the pressure chambers 34 for actuating the diaphragms to produce interlocking of the two wheel spiders.

Figure 4:
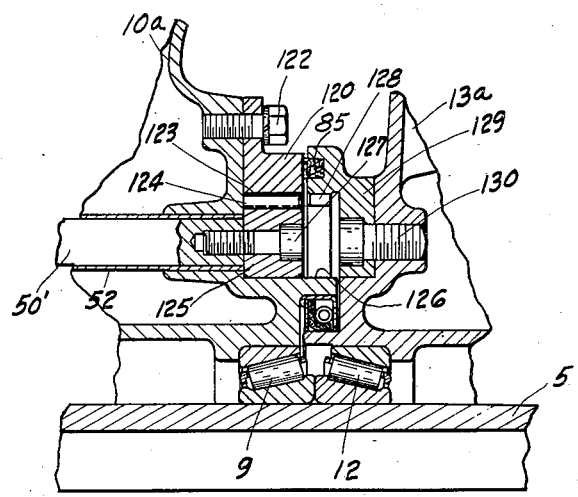
Figure 4 is a view similar to Figure 1 of a modified construction.

In the embodiment of the invention shown in Figure 4, a modified construction is provided wherein the interlocking of the two wheels to prevent relative rotation thereof is provided by means of a clutching arrangement in place of the poppet and apertured ring arrangement shown in Figures 1 and 3. With this construction, an axially shiftable ring gear is employed, while the two wheel spiders each carry corresponding internal gears so that axial movement of the ring gear will effect coupling or uncoupling between the two internal gears in the same manner as the plungers couple and uncouple the two wheel spiders in the previous embodiment.

In this form of the invention the wheel spider 10a is supported on the axle housing arm 5 by the bearings 9 in the same manner as described in connection with Figure 1. Similarly, the wheel spider 13a is supported on this arm by the bearings 12. However, the wheel spider 10a has secured to the axial face thereof the internal gear 120 which is rigidly secured to the spider by means of the circumferential series of studs 122. The gear 120 has gear teeth 123, which at all times are in engagement with the gear teeth 124 carried by an external ring gear 125 supported in the annular axial recess 126 in the hub portion of the spider 10a and secured to the ends of the plungers 50' by means of the screws 127.

It will thus be apparent that when the plungers are actuated, the ring gear 125 will move axially on the shoulder 126 toward the wheel spider 13a, and the teeth 124 of the ring gear will thus be adapted to couple between the teeth 123 of the gear 120 and the corresponding internal teeth 128 of the internal ring gear 129 secured to the wheel spider 13a by means of the screws 130. This produces a positive coupling between the wheel spiders, locking them against relative rotation during the application of the brakes.

By reason of the use of gears such as the gears 120, 125 and 129, it will be apparent that the maximum angular displacement possible between the wheels upon actuation of the plungers will be limited to one tooth space, which of course will be an angular movement determined by the number of teeth on the gears. Since all of the gear teeth will be in mesh during the coupling action, it is obvious that the teeth can be made small, thereby providing for a large number of teeth on each gear and reducing the possible relative rotation after application of the brakes to a minimum. While this construction is slightly more expensive than that shown in Figures 1 and 2, it has the advantage of eliminating, in a practical sense, any relative movement of the two wheel spiders after application of the brakes, and also insures ample bearing surface for dividing the braking reaction between the two wheel spiders. In connection with the plungers 50', it is to be understood that these plungers may be operated in the same manner as are the plungers 50 in Figure 1, and that the entire construction is exactly the same as in Figures 1 and 2 with the exception of the external ring gear carried by the plungers 50' and the two internal ring gears secured to adjacent faces of the wheel spiders and having corresponding pitched diameters.

Figure 5:
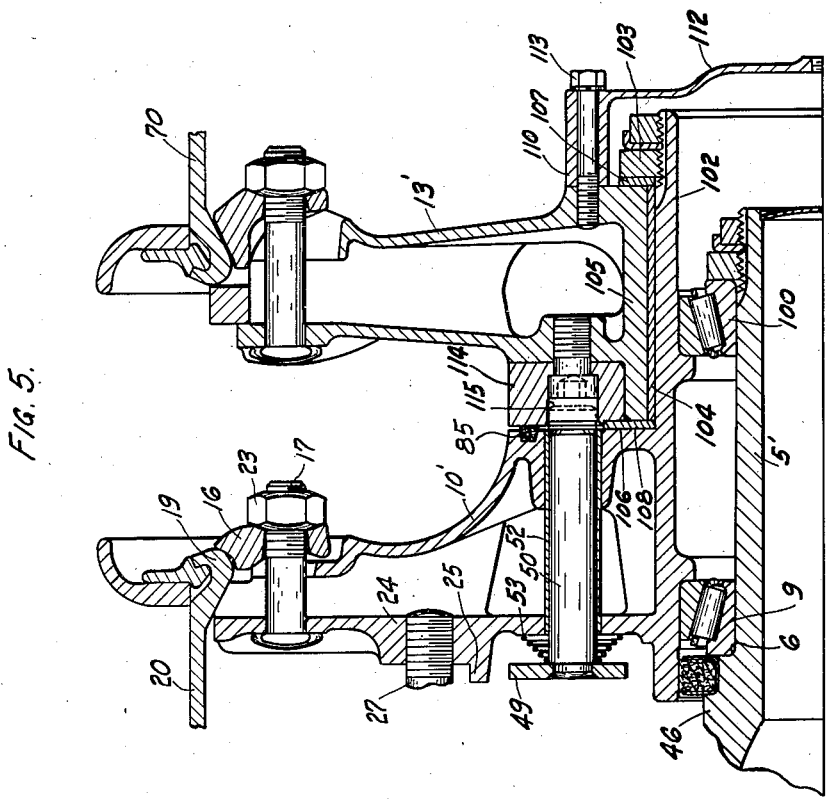
Figure 5 is a similar view of a still further modified arrangement.

Referring now to the embodiment of the invention shown in Figure 5, in this form of the invention the inboard wheel spider is axially extended to provide a bearing portion upon which the outboard wheel spider is rotatably mounted.

The axle housing arms 5' in this form of the invention is shortened, and receives only the two bearings comprising the bearing 9 and a corresponding bearing 100 upon which the hub portion 102 of the wheel spider 10' is mounted. This hub portion extends axially over the bearing 100 and outwardly beyond the end of the housing arm, and is threaded at its outer end to receive the nut 103. The extension 102 is machined to receive the brass bushing or sleeve 104 upon which is mounted the hub portion 105 of the wheel spider 13'. The brass bushing 104 provides a bearing accommodating the relative rotation of the wheel body 13' with respect to the wheel body 10'. Suitable thrust washers, as indicated at 106 and 107, are provided, the washer 106 bearing between the axial face 108 of the wheel spider 10' and the hub portion 105 of the wheel spider 13'. The thrust washer 107 is retained against the outer face of the wheel spider 13' by means of the nut 103.

Disposed radially outwardly of the thrust washer 107 is the flange portion 110 of a hub cap 112 which is secured to the outboard face of the hub 105 of the wheel spider 13' by a series of bolts 113. This closes the end of the axle and the bearings, and allows lubricant to be packed therein for lubricating the bearings 9 and 100, some of this lubricant being allowed to move about the nut 103 to lubricate the thrust washer 107, the sleeve 104 and the thrust washer 106.

The wheel body 13' receives a hardened steel ring 114 corresponding to the ring 76 of Figure 1, which is provided with corresponding openings 115 arranged circumferentially and adapted to receive the plungers 50 carried by the wheel spider 10'. The means for interlocking the wheel spiders 10' and 13' is identical with that described in connection with Figure 1, the plungers engaging in the openings 115 when actuated by the plungers 40 carried by the two diaphragm members 33. With this construction it will be apparent that the radial load on the wheel body 13' is carried by the bearing 100, and that the center line of the tread of the rims 20 and 70 passes downwardly between the bearings 9 and 100, thus providing an approved construction which is amply capable of taking care of the loads of the wheel assembly. The thrust washers 106 and 107 take the thrust reactions of the wheel spider 13', and since the pressures employed for actuating the plungers 50 are relatively small, there is no great amount of pressure imposed on these thrust washers. Of course it is to be understood that the clutching arrangement of Figure 4 may likewise be embodied in the mounting shown in Figure 5.

The relative amount of rotation between the wheel spiders is small compared to the absolute rotation thereof, and consequently the bushing sleeve 104 is ample to accommodate such relative rotation. This rotation occurs only in turning corners or if one tire has worn an appreciable amount compared to the other tire, but in any event is not at all severe.

It is therefore believed apparent that I have provided a compensating or differential wheel construction in which relative rotation of the two wheel spiders comprising the dual wheel assembly, is readily possible under normal conditions, but upon actuation of the brakes, the braking reaction is transmitted to both of the wheel spiders by reason of the interlocking mechanism which couples them against relative rotation upon actuation of the brakes. As indicated, this coupling mechanism can comprise either poppets or plungers movable axially into interlocking engagement between the two wheel spiders, or may comprise a shiftable gear sleeve for locking the two wheel spiders together.

I am aware that numerous changes may be made in certain details of the construction herein illustrated and described, and I therefore do not intend to be limited except as defined by the scope and spirit of the appended claims.

I claim:

1. In combination, a pair of independently rotatable wheels mounted in side by side relation, axially shiftable plungers in one wheel, a ring having alined apertures secured to the other wheel, and means for simultaneously shifting said plungers axially into said apertures to lock said wheels for conjoint rotation.

2. In combination, two adjacent independently rotatable wheels, a circumferential series of plungers carried in one wheel, means for conjointly moving said plungers axially, a ring carried by the other wheel, said ring having a circumferential series of axially directed recesses facing said plungers and adapted to receive the same for locking said wheels against relative rotation, and pressure operated means for braking said one wheel and simultaneously actuating said plunger moving means.

3. In combination, an axle arm, a pair of wheels independently rotatable thereon, a brake drum on one of said wheels, a backing plate on said arm, a plurality of plungers in said one wheel, a ring having alined axial apertures secured to the other wheel, said plungers being movable axially into said apertures to couple said wheels together for conjoint rotation, and pressure operated means on said backing plate operable to actuate said plungers.

4. In combination, a pair of independently rotatable wheels, a circumferential series of axially shiftable plungers around the hub of said one wheel, coaxial internal gears secured to adjacent faces of said wheels, and ring gear means secured to said plungers and shiftable therewith to clutch said two gears against relative rotation.

5. In combination, a pair of independently rotatable wheels, a circumferential series of axially shiftable plungers carried by one of said wheels and operable in shifted position toward the other wheel to clutch said two wheels against relative rotation, a ring on the inboard side of said one wheel connected to the inboard ends of said plungers, a second non-rotatable ring axially shiftable toward and away from said first ring, and pressure-operated means engaging said second ring for moving it against said first ring to shift said plungers conjointly into said shifted position.

6. The combination of claim 5 further characterized in the provision of braking means for said one wheel, and means energizing said braking means independently of the clutching engagement of said plungers.

7. In combination, an axle spindle, a first rotatable wheel having a cylindrical hub extension, spaced bearing means supporting said wheel on said spindle, a second rotatable wheel journalled entirely on said extension and relatively rotatable with respect to the first wheel, a first locking element fixed to one wheel, and a second locking element on the other wheel axially shiftable into engagement with said first element for locking said wheels against relative rotation.

8. In combination, an axle arm, a pair of coaxial wheels independently rotatable relative to said arm, a backing plate carried by said arm, a brake drum carried by the inboard wheels, braking means engageable with said drum and mounted on said backing plate, means axially shiftable through the hub portion of said inboard wheel for locking said wheels against relative rotation, and means for actuating said last-named means independently of said braking means.

9. The combination of claim 8 further characterized in the provision of pneumatically-actuated plungers for shifting said locking means.

10. In combination, a shaft, a first wheel rotatably journalled on said shaft and having a cylindrical hub extension, a second wheel, means for journalling said second wheel on said extension for rotation relative to said first wheel, means axially shiftable through the hub of said first wheel for locking said wheels together, brake means for said first wheel, and independent actuating means for said locking means and said brake means.

11. In combination, a pair of independently rotatable wheels mounted in side by side relation, a plurality of axially shiftable plungers in one of said wheels engageable with the other wheel for locking said wheels for conjoint rotation, a ring engageable with all said plungers for shifting the same simultaneously, a backing plate adjacent said one wheel, pneumatically operable cylinders secured thereto, and means shiftable axially upon conjoint operation of said cylinders for engaging said ring to effect actuation of said plungers.

12. In combination, a pair of independently rotatable wheels mounted in side by side relation, a backing plate adjacent the inboard wheel, a brake drum on the inboard wheel, brake means on said backing plate engaging said drum, locking means between said wheels, and independent means on said backing plate for actuating said locking means.

13. The combination of claim 12 wherein said brake means and said locking means are actuated simultaneously.

14. In combination, a first rotatable wheel, a second wheel rotatable relative thereto, said first wheel having a circumferential series of axially shiftable plungers in the hub thereof, a ring connecting adjacent ends of all said plungers, a ring secured to said second wheel and having a circumferential series of axial apertures adapted to receive the free ends of said plungers for locking said wheels against relative rotation, and means for axially shifting said first-named ring toward said second wheel.

15. In combination, a first rotatable wheel, a second wheel rotatable relative thereto, said first wheel having a circumferential series of axially shiftable plungers in the hub thereof, a ring connecting adjacent ends of all said plungers, a ring secured to said second wheel and having a circumferential series of axial apertures adapted to receive the free ends of said plungers for locking said wheels against relative rotation, means for axially shifting said first-named ring toward said second wheel, and braking means for braking said first wheel operable independently of said ring shifting means.

16. In combination, an axle spindle, a first wheel having a hub extension, axially spaced bearing means rotatably supporting said wheel on said spindle, a second wheel having its hub portion journalled entirely on said hub extension, and means carried by said first wheel and axially shiftable into engagement with said second wheel to clutch said wheels together for conjoint rotation.

FREDERICK W. BURGER.